(12) United States Patent
Park et al.

(10) Patent No.: US 9,025,010 B2
(45) Date of Patent: May 5, 2015

(54) LIGHT AMOUNT ADJUSTING APPARATUS AND PHOTOGRAPHING APPARATUS INCLUDING THE SAME

(75) Inventors: Chi-young Park, Suwon-si (KR); Kwang-seok Byon, Yongin-si (KR); Jung-soo Kim, Suwon-si (KR); Jin-young Bang, Yongin-si (KR); Young-jae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 13/447,386

(22) Filed: Apr. 16, 2012

(65) Prior Publication Data

US 2013/0027524 A1    Jan. 31, 2013

(30) Foreign Application Priority Data

Jul. 26, 2011  (KR) ........................ 10-2011-0074120

(51) Int. Cl.
| | |
|---|---|
| *H04N 13/02* | (2006.01) |
| *G03B 9/06* | (2006.01) |
| *G03B 9/14* | (2006.01) |
| *G03B 9/26* | (2006.01) |
| *G03B 35/04* | (2006.01) |

(52) U.S. Cl.
CPC .............. *G03B 9/06* (2013.01); *H04N 13/0217* (2013.01); *H04N 13/0289* (2013.01); *G03B 9/14* (2013.01); *G03B 9/26* (2013.01); *G03B 35/04* (2013.01)

(58) Field of Classification Search
CPC ........... H04N 13/0217; H04N 13/0289; G03B 35/04; G03B 9/26; G03B 9/06; G03B 9/14

USPC ............................................................ 348/49
See application file for complete search history.

(56) References Cited

U.S. PATENT DOCUMENTS

| | | | | |
|---|---|---|---|---|
| 5,606,363 | A | * | 2/1997 | Songer ............................ 348/49 |
| 5,727,242 | A | * | 3/1998 | Lo et al. ........................ 396/324 |
| 5,828,487 | A | | 10/1998 | Greening et al. |
| 6,115,059 | A | * | 9/2000 | Son et al. ........................ 348/46 |
| 8,363,156 | B2 | * | 1/2013 | Lo .................................. 348/362 |
| 2005/0140820 | A1 | * | 6/2005 | Takeuchi et al. ............... 348/362 |
| 2012/0057000 | A1 | * | 3/2012 | Rohaly et al. ................... 348/49 |
| 2012/0320164 | A1 | * | 12/2012 | Lipton ............................ 348/49 |

FOREIGN PATENT DOCUMENTS

JP           08-069063 A           3/1996

* cited by examiner

*Primary Examiner* — Jay Patel
*Assistant Examiner* — Francis G Geroleo
(74) *Attorney, Agent, or Firm* — Drinker Biddle & Reath LLP

(57) ABSTRACT

A light amount adjusting apparatus includes: a two-dimensional (2D) aperture assembly that adjusts an opening area of a via hole through which light is transmitted; a three-dimensional (3D) aperture plate that forms a first opening and a second opening by blocking a part of the via hole, or moving to outside of the via hole to open the via hole; a first shielding plate that is movable to open or close the first opening; and a second shielding plate that is movable so as to close the second opening when the first shielding plate opens the first opening and to open the second opening when the first shielding plate closes the first opening.

16 Claims, 6 Drawing Sheets

LIGHT AMOUNT ADJUSTING APPARATUS AND PHOTOGRAPHING APPARATUS INCLUDING THE SAME

CROSS-REFERENCE TO RELATED PATENT APPLICATION

This application claims the priority benefit of Korean Patent Application No. 10-2011-0074120, filed on Jul. 26, 2011, in the Korean Intellectual Property Office, the disclosure of which is incorporated herein in its entirety by reference.

BACKGROUND

1. Field

Embodiments relate to a light amount adjusting apparatus and a photographing apparatus including the light amount adjusting apparatus, and more particularly, to a light amount adjusting apparatus and a photographing apparatus capable of photographing selectively a three-dimensional (3D) image and a two-dimensional (2D) image with high speed changing.

2. Description of the Related Art

Recently, image products using three-dimensional (3D) images have been produced a lot, and 3D movies, 3D televisions, and 3D games have been widely distributed. 3D images represent the same cubic effect that is felt when a human being sees an object with his/her eyes. The 3D images are conventionally used in a limited field such as medical equipment; however, 3D images have affected fields to which ordinary people directly contact. Accordingly, users' desires for taking 3D images directly are increasing.

In order to provide a viewer with 3D images, images taken from different angles are to be provided simultaneously to both eyes of a human being, and thus, an apparatus taking 3D images has to acquire images seen from different angles simultaneously. The 3D image photographing apparatus has different optical and mechanical structures from those of a 2D image photographing apparatus that takes only one image at a time. Therefore, in order to realize the 2D photographing and 3D photographing simultaneously, separate lenses and separate imaging devices are provided in one photographing apparatus. However, a volume and a weight of the photographing apparatus increase, and manufacturing costs also increase. Thus, Patent Document 1 (JP 1996-069063) discloses that 3D images are obtained by disposing two openings in one aperture. However, liquid crystal is used to block the openings, and thus, fabrication costs increase. In addition, other components for controlling a light transmittance of the liquid crystal are necessary, and thus, a structure of the apparatus becomes complex.

SUMMARY

Embodiments include a light amount adjusting apparatus and a photographing apparatus including the light amount adjusting apparatus, which is capable of selectively photographing three-dimensional (3D) images and two-dimensional (2D) images.

Embodiments also include a light amount adjusting apparatus that may be driven at high speed when 3D images are taken, and a photographing apparatus including the light amount adjusting apparatus.

According to an embodiment, a light amount adjusting apparatus includes: a two-dimensional (2D) aperture assembly that adjusts an opening area of a via hole through which light is transmitted; a three-dimensional (3D) aperture plate that forms a first opening and a second opening by blocking a part of the via hole, or moving to outside of the via hole to open the via hole; a first shielding plate that is movable to open or close the first opening; and a second shielding plate that is movable so as to close the second opening when the first shielding plate opens the first opening and to open the second opening when the first shielding plate closes the first opening.

The first shielding plate may include a first center axis formed on an edge of the first shielding plate so as to rotate based on the first center axis, and the second shielding plate may include a second center axis formed on an edge of the second shielding plate so as to rotate based on the second center axis.

The first and second center axes may be disposed on an outer side of the via hole, the first shielding plate may be extended within a predetermined angle range based on the first center axis, and the second shielding plate may be extended within a predetermined angle range based on the second center axis.

The first and second shielding plates may be rotatable by 360°.

The light amount adjusting apparatus may further include: a first shielding plate driving unit that drives the first shielding plate; and a second shielding plate driving unit that drives the second shielding plate.

The first shielding plate driving unit may include a first motor and a first gear assembly that connects the first motor to the first center axis in order to transfer a driving force to the first shielding plate, and the second shielding plate driving unit may include a second motor and a second gear assembly that connects the second motor to the second center axis in order to transfer the driving force to the second shielding plate.

The 3D aperture plate may include: a first 3D aperture plate including a first via hole that may form the first opening; and a second 3D aperture plate including a second via hole that may form the second opening.

The light amount adjusting apparatus may further include a first intermediate plate disposed between the 2D aperture assembly and the 3D aperture plate to support the 3D aperture plate.

The light amount adjusting apparatus may further include a 3D driving unit that simultaneously drives the first 3D aperture plate and the second 3D aperture plate.

The first 3D aperture plate may include a first through hole disposed on an outer side of the via hole, the first intermediate plate may include a first boss that is inserted into the first through hole so as to rotatably support the first 3D aperture plate, the second 3D aperture plate may include a second through hole disposed on an outer side of the via hole, and the first intermediate plate may include a second boss that is inserted into the second through hole so as to rotatably support the second 3D aperture plate.

The first intermediate plate may include a guide recess between the first boss and the second boss, the first 3D aperture plate may include a third through hole disposed on a portion corresponding to the guide recess, the second 3D aperture plate may include a fourth through hole disposed on a portion corresponding to the guide recess, and the 3D driving unit may include a driving pin that is inserted into the guide recess after penetrating through the third and fourth through holes so as to move along the guide recess.

The first 3D aperture plate and the second 3D aperture plate may be simultaneously rotated on the first through hole and the second through hole when the driving pin is moved.

The light amount adjusting apparatus may further include: a first location sensor that senses whether the first shielding plate is located on a portion of closing the first opening or opening the first opening; and a second location sensor that senses whether the second shielding plate is located on a portion of closing the second opening or opening the second opening.

According to another embodiment, a photographing apparatus includes a light amount adjusting apparatus including: a two-dimensional (2D) aperture assembly that adjusts an opening area of a via hole through which light is transmitted; a three-dimensional (3D) aperture plate that forms a first opening and a second opening by blocking a part of the via hole, or moving to outside of the via hole to open the via hole; a first shielding plate that is movable to open or close the first opening; and a second shielding plate that is movable so as to close the second opening when the first shielding plate opens the first opening and to open the second opening when the first shielding plate closes the first opening; an imaging device that converts the light transmitted through the light amount adjusting apparatus into an electric signal; and a controller that executes a photographing apparatus by controlling the imaging device and the light amount adjusting apparatus, and selectively performing a 3D photographing mode in which two images are obtained by opening sequentially the first opening and the second opening that are formed by the 3D aperture plate and a 2D photographing mode in which an image is obtained by using the via hole opened by the 3D aperture plate.

The controller may synchronize an image quality frame of moving picture and a frequency controlling the shielding plate driving unit, when the moving picture is captured in the 3D photographing mode.

The first shielding plate and the second shielding plate may be continuously rotated when the moving picture is captured in the 3D photographing mode.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will be described in detail with reference to accompanying drawings.

Figure 1:
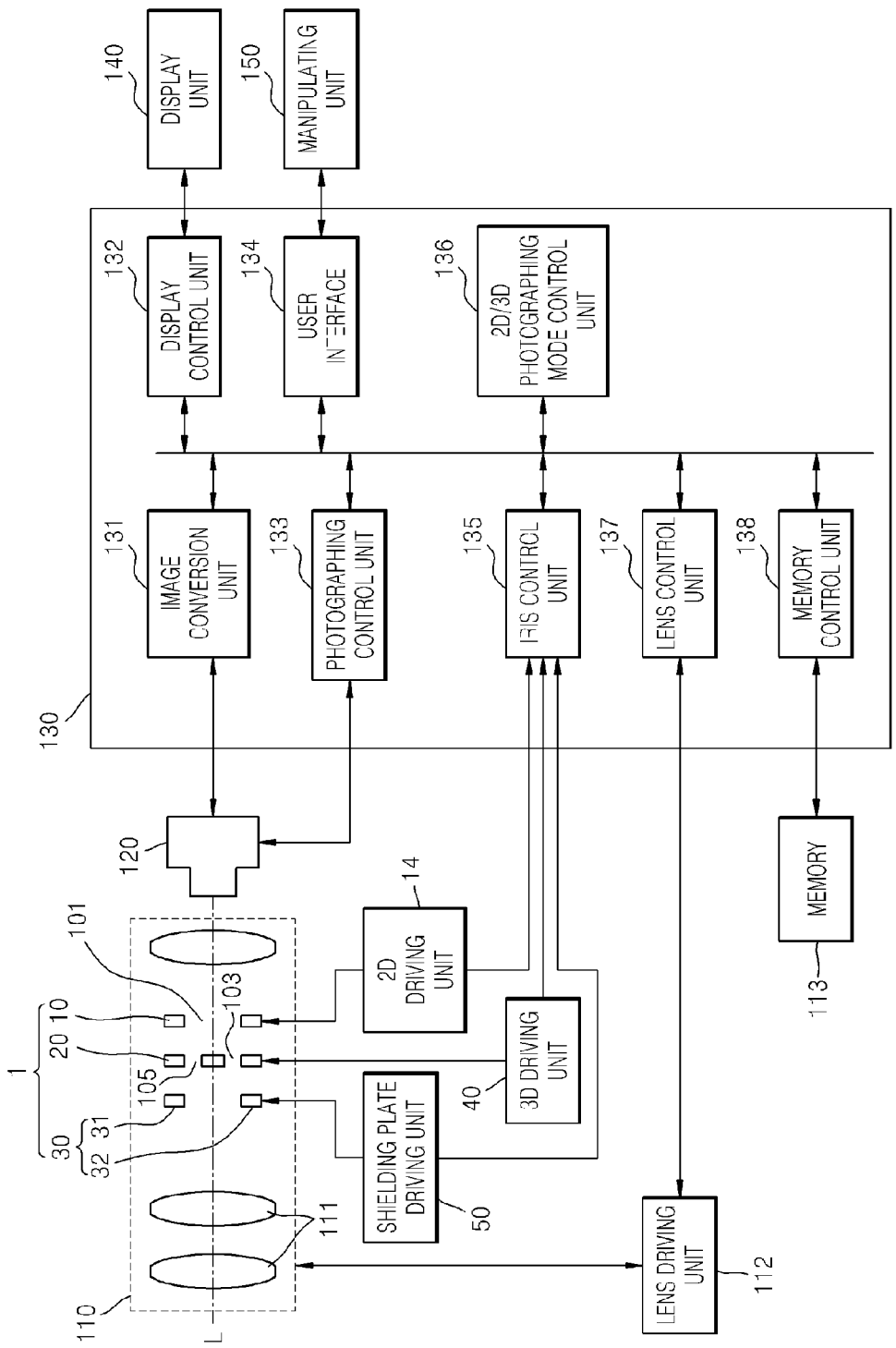
FIG. 1 is a schematic block diagram of a photographing apparatus including a light amount adjusting apparatus, according to an embodiment.

FIG. 1 is a schematic block diagram of a photographing apparatus including a light amount adjusting apparatus 1, according to an embodiment.

The photographing apparatus of FIG. 1 includes the light amount adjusting apparatus 1, an imaging device 120 that converts light transmitted through the light amount adjusting apparatus 1 into electric signals, and a controller 130 that controls driving units 14, 40, and 50 of the imaging device 120, a lens driving unit 112, and the light amount adjusting apparatus 1 to perform a photographing operation.

The light amount adjusting apparatus 1 includes a two-dimensional (2D) aperture assembly 10 having a via hole 101 through which light is transmitted, a three-dimensional (3D) aperture plate 20 that forms a first opening 103 and a second opening 105 by blocking a part of the via hole 101, and a shielding plate 30 that operates so that images may be taken from different angles when a 3D photographing is performed. Here, the shielding plate 30 includes a first shielding plate 31 that opens or closes the first opening 103, and a second shielding plate 32 that opens or closes the second opening 105.

When the 2D image photographing is performed, the 2D aperture assembly 10 of the light amount adjusting apparatus 1 adjusts an opening area of the via hole 101, and the 3D aperture plate 20 and the shielding plate 30 are disposed on an outer side of the via hole 101. When the 3D image photographing is performed, the 3D aperture plate 20 of the light amount adjusting apparatus 1 closes a part of the via hole 101 to form the first opening 103 and the second opening 105, and the shielding plate 30 operates to capture two images sequentially from the light incident through the first opening 103 or the second opening 105. Therefore, the photographing apparatus may easily perform one of the 2D photographing mode and the 3D photographing mode.

The photographing apparatus of the present embodiment may be realized as various types such as a digital still camera taking still images or a digital video camera taking moving pictures.

The imaging device 120 includes a photoelectric converting device such as a charged coupled device (CCD) or a complementary metal oxide semiconductor (CMOS), and converts the light of images incident through lenses 111 and the light amount adjusting apparatus 1 into electric signals. The imaging device 120 is driven by a controlling signal applied from a photographing control unit 133.

An image conversion unit 131 converts the electric signal of the imaging device 120 into image data so as to perform image processes or to store the image data in a storage medium such as a memory 113.

An optical system 110 disposed in front of the imaging device 120 includes a plurality of lenses 111 and the light amount adjusting apparatus 1, and focuses image light from the outside onto an imaging surface of the imaging device 120.

The lenses 111 may be arranged so that gaps between the lenses are variable. When the gap between the lenses 111 is changed, a zoom magnification or a focus may be adjusted. The lenses are arranged along an optical axis L, and the optical axis L refers to a straight line connecting optical centers of the lenses 111.

The lenses 111 are driven by the lens driving unit 112 having a driving unit such as a zoom motor (not shown) so that locations with respect to each other may be changed. The lenses 111 may include a zoom lens for magnifying or reducing a size of an object, and a focus lens performing a focusing operation of the object.

The lens driving unit 112 operates in receiving a control signal from a lens control unit 137 of the controller 130 in order to control locations of the lenses 111 so that the lenses 111 may have one of a plurality of magnifications.

The controller 130 is electrically connected to the imaging device 120, the lens driving unit 112, a display unit 140, a manipulating unit 150, the driving units 14, 40, and 50 of the light amount adjusting device 1, and the memory 113. In addition, the controller 130 may transmit/receive control signals to/from the above components, or process data in order to control the operation of each component.

The controller 130 includes an image conversion unit 131, a display control unit 132, a photographing control unit 133, a user interface 134, an iris control unit 135, a 2D/3D photographing mode control unit 136, a lens control unit 137, and a memory control unit 138.

The controller 130 may be a micro chip or a circuit board including the micro chip, and each of the components included in the controller 130 may be realized by software or circuits built in the controller 130.

The memory control unit 138 controls recording of data onto the memory 113, and writing and reading of the recorded data and setting information. The memory 113 may be a volatile built-in memory such as a synchronous dynamic random access memory (SDRAM), or may be a non-volatile external memory. The memory 113 may perform a buffer memory function for temporarily storing the image data generated by the image conversion unit 131, and an operation memory function for processing data.

The photographing apparatus may include the display unit 140 that displays images of the image data. The display unit 140 may be a touch screen that senses a touch on a surface of a display apparatus, for example, a liquid crystal display (LCD) or an organic light emitting diode (OLED), and generate a signal corresponding to the sensed location.

The manipulating unit 150 receives an operation of a user. The manipulating unit 150 may be a menu operating button or a jog dial. The manipulating unit 150 may include a button for commanding the 2D or 3D photographing so that the user may select one of the 2D and 3D photographing modes via the manipulating unit 150.

The user interface 134 disposed in the controller 130 receives the signal from the manipulating unit 150, and then, transmits/receives the signals to/from the iris control unit 135 and the 2D/3D photographing mode control unit 136.

The 2D/3D photographing mode control unit 136 sets whether the photographing apparatus operates in the 2D photographing mode for obtaining 2D images or in the 3D photographing mode for obtaining 3D images. Operating types of the iris control unit 135 and the photographing control unit 133 may vary based on the photographing mode.

The iris control unit 135 applies a control signal to the 3D driving unit 40, the shielding plate driving unit 50, and the 2D driving unit 14 so as to control driving of the 3D aperture plate 20, the shielding plate 30, and the 2D aperture assembly 10.

Figure 2:
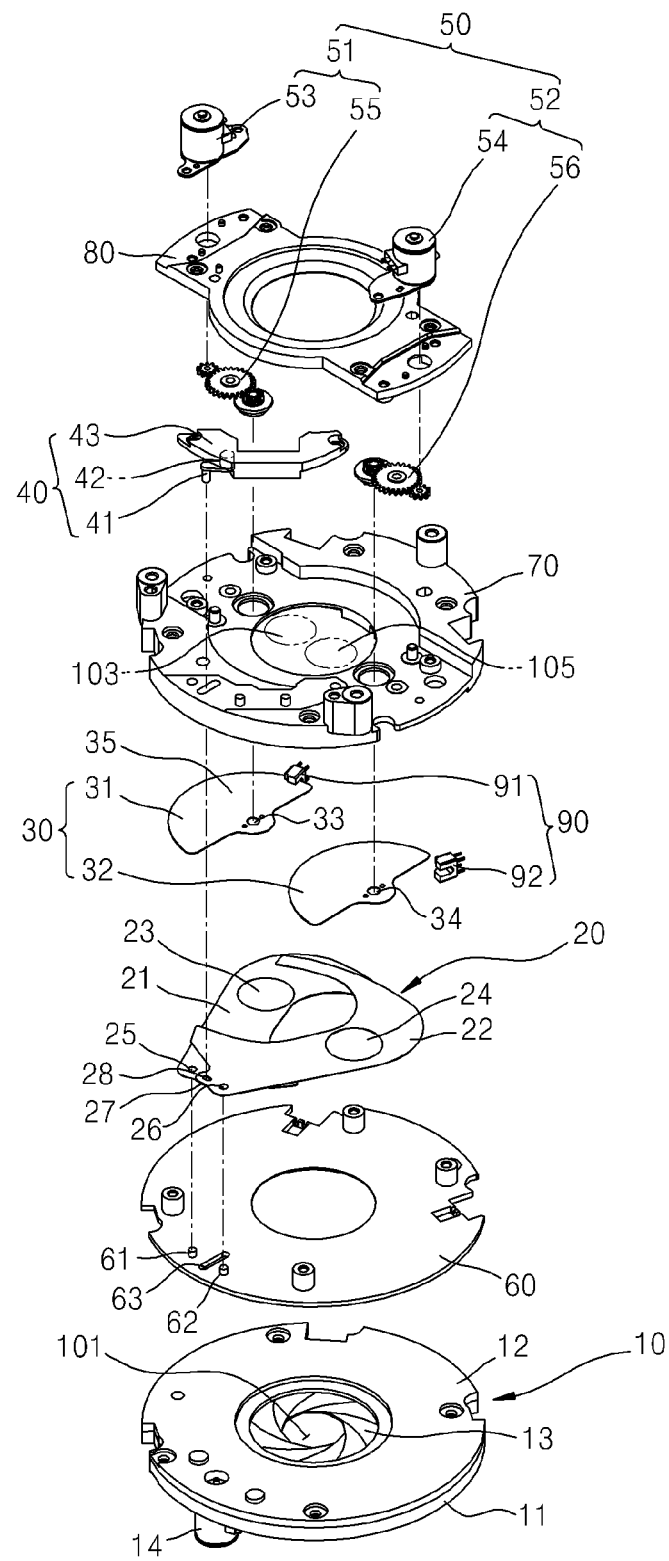
FIG. 2 is an exploded view of the light amount adjusting apparatus of FIG. 1, according to an embodiment.
Figure 3:
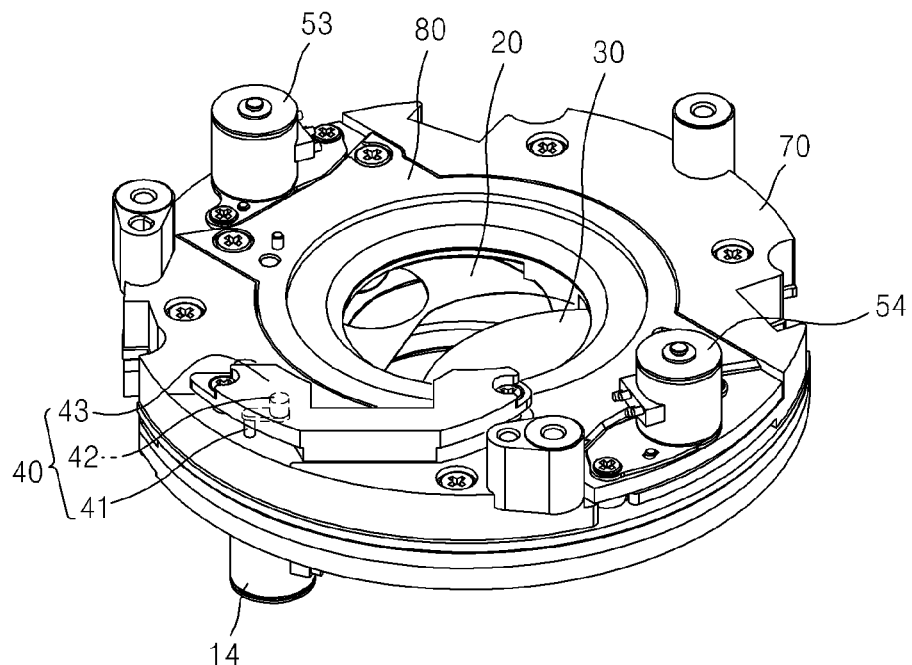
FIG. 3 is a perspective view of the light amount adjusting apparatus in which components shown in FIG. 2 are coupled to each other, according to an embodiment.

FIG. 2 is an exploded view of the light amount adjusting apparatus 1 of FIG. 1, and FIG. 3 is a perspective view of the light amount adjusting apparatus 1 in which components shown in FIG. 2 are coupled to each other, according to an embodiment.

The light amount adjusting apparatus 1 shown in FIGS. 2 and 3 includes the 2D aperture assembly 10 that adjusts an opening area of the via hole 101 through which the light is transmitted, the 3D aperture plate 20 that forms the first opening 103 and the second opening 105 by blocking a part of the via hole 101 and opening the via hole 101 by moving to an outer portion of the via hole 101, and the shielding plate 30 that opens or closes the first opening 103 or the second opening 105. The shielding plate 30 includes a first shielding plate 31 for opening or closing the first opening 103, and a second shielding plate 32 for opening or closing the second opening 105. The above components are arranged to correspond to the optical axis.

The 3D aperture plate 20 is connected to the 3D driving unit 40 that drives the 3D aperture plate 20, and the shielding plate 30 is connected to the shielding plate driving unit 50 that drives the shielding plate 30. In addition, a first intermediate plate 60 and a second intermediate plate 70 are arranged so as to support the 3D aperture plate 20, the shielding plate 30, and the driving units 40 and 50. The first intermediate plate 60 and the second intermediate plate 70 may be connected to the 2D aperture assembly 10 via a coupling unit such as a screw.

The 2D aperture assembly 10 includes a 2D aperture base 11, a 2D aperture cover 12, a 2D aperture plate 13 disposed between the 2D aperture base 11 and the 2D aperture cover 12, and the 2D aperture driving unit 14. In addition, the 2D aperture assembly 10 may further include a rotary ring (not shown) that connects the 2D aperture plate 13 to the 2D aperture driving unit 14 so that the rotary force of the 2D aperture driving unit 14 may be transferred to the 2D aperture plate 13. The 2D aperture driving unit 14 may be a stepping motor, and a gear assembly may be disposed between the stepping motor and the rotary ring (not shown). The 2D aperture plate 13 is connected to the rotary ring so as to be rotated in communication with the rotary ring due to the rotating force transferred from the rotary ring as the rotary ring rotates. Therefore, the 2D aperture assembly 10 may adjust the opening area of the via hole 101 by adjusting rotating direction and rotating amount of the rotary ring.

However, the 2D aperture assembly 10 may adjust the opening area of the via hole 101 by using various methods, besides the above described method.

The 3D aperture plate 20 is disposed on the 2D aperture assembly 10. The 3D aperture plate 20 includes a first 3D aperture plate 21 including a first via hole 23 that may form the first opening 103, and a second 3D aperture plate 22 including a second via hole 24 that may form the second opening 105.

The 3D aperture plate 20 is disposed on the outer portion of the via hole 101 when the 2D images are taken, and thus, the light transmitting through the lenses 111 shown in FIG. 1 reaches the 2D aperture assembly 10 without being blocked by the 3D aperture plate 20. The light transmitted through the via hole 101 of the 2D aperture assembly 10 may reach the imaging device 120 shown in FIG. 1. When the 3D images are taken, the first 3D aperture plate 21 and the second 3D aperture plate 22 of the 3D aperture plate 20 are disposed on a region corresponding to the via hole 101 to form the first opening 103 and the second opening 105. In order to obtain the 3D images, the images seen from different viewing angles are necessary, and thus, the first opening 103 and the second opening 105 are separated a predetermined distance from each other. The distance between the first opening 103 and the second opening 105 may correspond to a distance between two eyes of a human being. The 3D aperture plate 20 is driven by the 3D driving unit 40, and is rotatably supported by a first boss 61 and a second boss 62 that protrude from the first intermediate plate 60. Principles of driving the 3D aperture plate 20 will be described later.

The shielding plate 30 is disposed between the 3D aperture plate 20 and the second intermediate plate 70. The shielding plate 30 includes a first shielding plate 31 that opens or closes the first opening 103, and a second shielding plate 32 that opens or closes the second opening 105.

In order to obtain the images incident through the first opening 103 and the second opening 105, the first opening 103 and the second opening 105 have to be closed sequentially. A first center axis 33 corresponding to a rotating center is disposed on an edge of the first shielding plate 31. The first center axis 33 is disposed on an outer portion of the via hole 101 so as not to block the incident light when the 2D images are taken. The first shielding plate 31 is rotatably supported by the second intermediate plate 70 so as to rotate based on the first center axis 33. The first shielding plate 31 includes a first shielding unit 35 that is formed within a predetermined angle range based on the first center axis 33 to block the light. According to the present embodiment, the first shielding unit 35 is formed as a semi-circle; however, this should not be construed as limiting. However, a size of the first shielding unit 35 has to be large enough to completely block the first opening 103 on a portion where the first opening 103 is closed. The second shielding plate 32 has the same structure as the first shielding plate 31, and thus descriptions are not provided here.

The shielding plate 30 is driven by the shielding plate driving unit 50. The shielding plate driving unit 50 includes a first shielding plate driving unit 51 for driving the first shielding plate 31 and a second shielding plate driving unit 52 for driving the second shielding plate 32. The first shielding plate driving unit 51 may include a first shielding plate driving motor 53 and a first gear assembly 55, which will be described later.

The first intermediate plate 60 is disposed between the 2D aperture assembly 10 and the 3D aperture plate 20 to support the 3D aperture plate 20 by using the first boss 61 and the second boss 62. The second intermediate plate 70 is disposed between the shielding plate 30 and the driving units 40 and 50 to support the shielding plate 30 and the driving units 40 and 50. A cover plate 80 may be disposed on the second intermediate plate 70 for covering the components. In the present embodiment, shielding plate driving motors 53 and 54 are fixed on the cover plate 80 by screws.

According to the light amount adjusting apparatus 1 having the above described structure, movements of the 2D aperture assembly 10, the 3D aperture plate 20, and the shielding plate 30 may be controlled by the driving units 14, 40, and 50 that transmit/receive signals to/from the controller 130 shown in FIG. 1. The light amount adjusting apparatus 1 assists the controller 130 to select and execute one of the 2D photographing mode for photographing 2D images and the 3D photographing mode for photographing 3D images. Therefore, the 2D photographing mode and the 3D photographing mode may be performed without using an additional device by using the photographing apparatus including the light amount adjusting apparatus 1.

Figure 4:
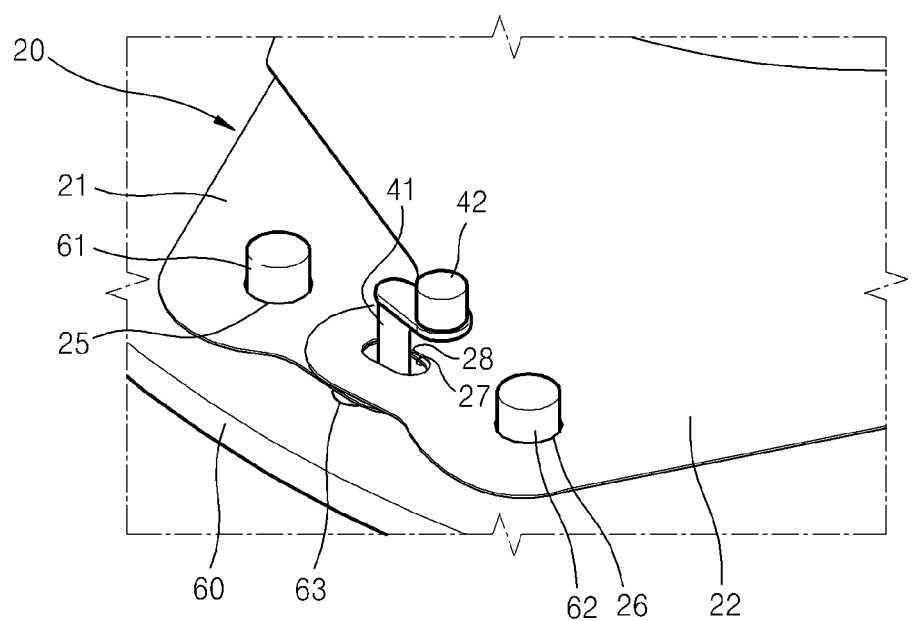
FIG. 4 is a diagram illustrating principles of operating a three-dimensional (3D) aperture plate in the light amount adjusting apparatus of FIG. 3, according to an embodiment.
Figure 5:
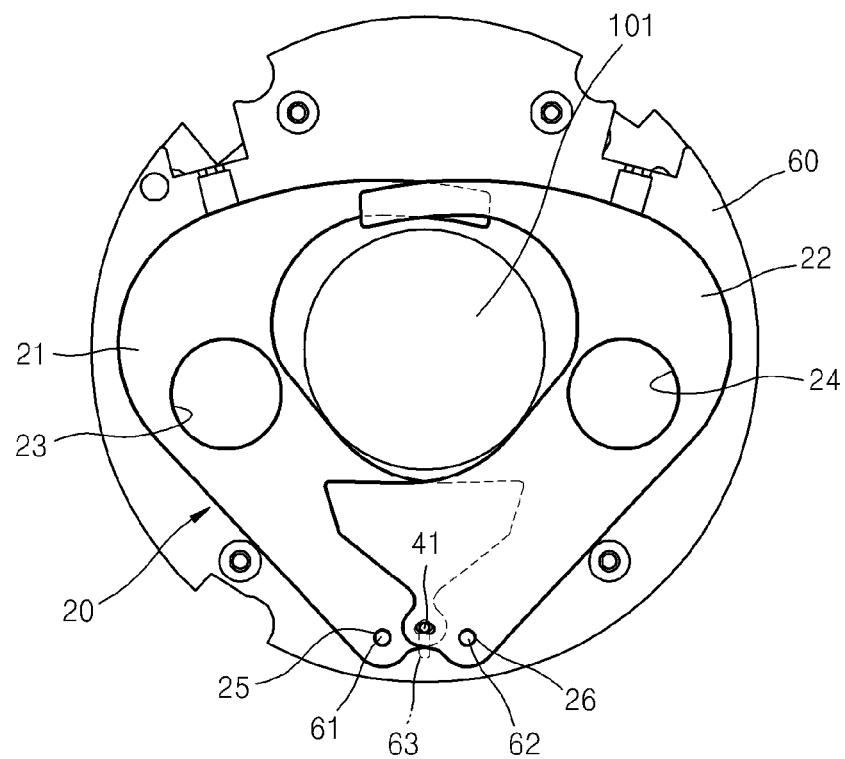
FIGS. 5 and 6 are plan views showing an operating state of the 3D aperture plate in the light amount adjusting apparatus of FIG. 3, according to an embodiment.
Figure 6:
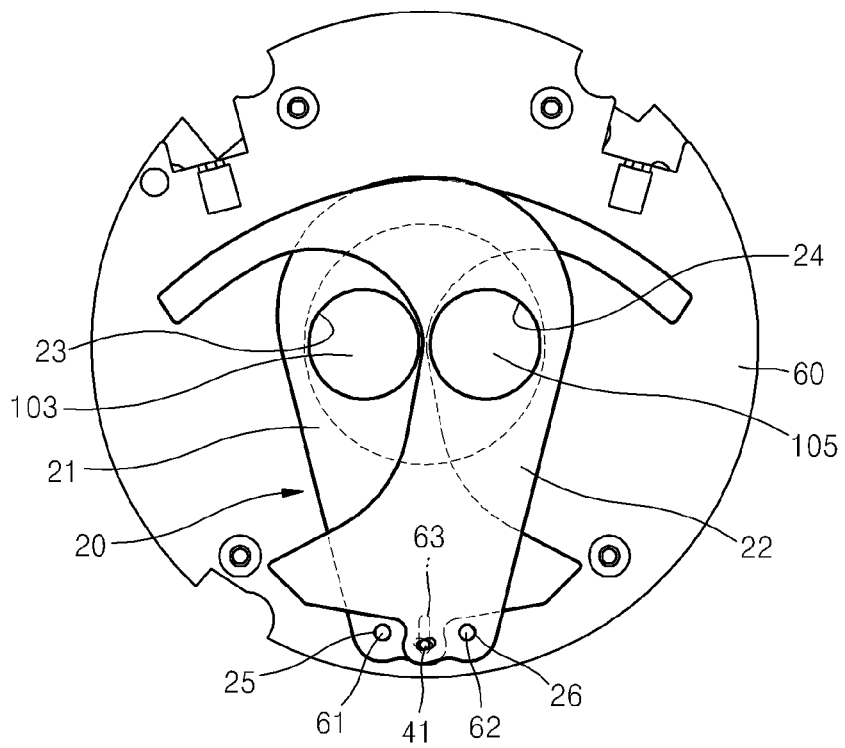

FIG. 4 is a diagram illustrating principles of operating the 3D aperture plate 20 in the light amount adjusting apparatus 1 of FIG. 3, and FIGS. 5 and 6 are plan views showing an operating state of the 3D aperture plate 20 in the light amount adjusting apparatus 1 of FIG. 3, according to an embodiment.

Referring to FIGS. 4 through 6, the 3D aperture plate 20 includes the first 3D aperture plate 21 including the first via hole 23 and the second 3D aperture plate 22 including the second via hole 24. A first through hole 25 is disposed on an edge of the first 3D aperture plate 21, and the first boss 61 protruding from the first intermediate plate 60 is inserted in the first through hole 25. Therefore, the first 3D aperture plate 21 is supported by the first intermediate plate 60 so as to rotate based on the first through hole 25. Likewise, the second 3D aperture plate 22 includes a second through hole 26, and the second boss 62 is inserted in the second through hole 26 so that the second 3D aperture plate 22 is supported by the first intermediate plate 60. The first 3D aperture plate 21 and the second 3D aperture plate 22 are symmetrically disposed based on the via hole 101, and the first through hole 25 and the second through hole 26 are disposed on an outer portion of the via hole 101 so as not to block the light incident through the via hole 101 when the 2D images are taken.

The first intermediate plate 60 includes a guide recess 63 between the first boss 61 and the second boss 62. A third through hole 27 of the first 3D aperture plate 21 and a fourth through hole 28 of the second 3D aperture plate 22 are sequentially disposed on a portion corresponding to the guide recess 63. The 3D aperture plate 20 is driven by the 3D driving unit 40 of FIG. 1. In more detail, a driving pin 41 movably disposed on the 3D driving unit 40 is inserted into the guide recess 63 after penetrating through the third and fourth through holes 27 and 28, and then, moves along the guide recess 63 to rotate the first and second 3D aperture plates 21 and 22.

FIG. 5 shows a state where the driving pin 41 is located on a portion in the guide recess 63, which is close to the via hole 101, and denotes that the 3D aperture plate 20 is located on the outer portion of the via hole 101 when the 2D images are taken. FIG. 6 shows a state where the driving pin 41 is located on a portion in the guide recess 63, which is far from the via hole 101, and denotes that the 3D aperture plate 20 blocks a part of the via hole 101 to form the first opening 103 and the second opening 105 when the 3D images are taken.

The first via hole 23 formed in the first 3D aperture plate 21 forms the first opening 103, and the second via hole 24 formed in the second 3D aperture plate 22 forms the second opening 105. However, this should not be construed as limiting, that is, the first 3D aperture plate 21 may form a part of the first opening 103 and a part of the second opening 105, and the second 3D aperture plate 22 may form the other part of the first opening 103 and the other part of the second opening 105 so that the first and second openings 103 and 105 may be formed by combining the first and second 3D aperture plates 21 and 22.

The 3D driving unit 40 may be formed as a voice coil motor (VCM). The 3D driving unit 40 of FIG. 2 includes a supporting unit 43 that supports a yoke (not shown) formed of a magnetic substrate and a coil (not shown), on which electric current flows, wound on the yoke (not shown), the driving pin 41, and a magnet 42. When the electric current flows in the coil, a magnetic force is applied to the yoke, and the magnet 42 moves due to the magnetic force and the driving pin 41 attached on the magnet 42 is moved.

As described above, the driving pin 41 is inserted in the guide recess 63 after penetrating through the third and fourth through holes 27 and 28, and thus, the driving pin 41 makes the first and second 3D aperture plates 21 and 22 move while moving along the guide recess 63. However, the 3D driving unit 40 of the present embodiment is not limited to the above structure, and various units such as a stepping motor, a solenoid, an ultrasonic motor, and a pneumatic cylinder may be used to rotate the 3D aperture plate 20.

Figure 7:
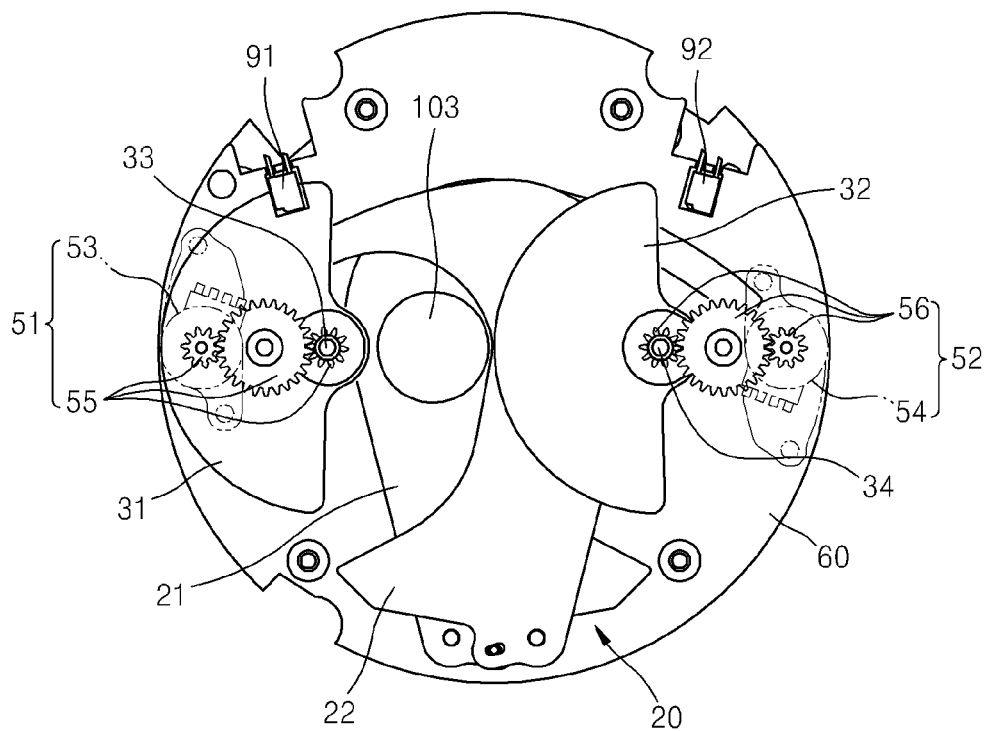
FIGS. 7 and 8 are plan views showing states of operating a shielding plate in the light amount adjusting apparatus of FIG. 3, according to an embodiment.
Figure 8:
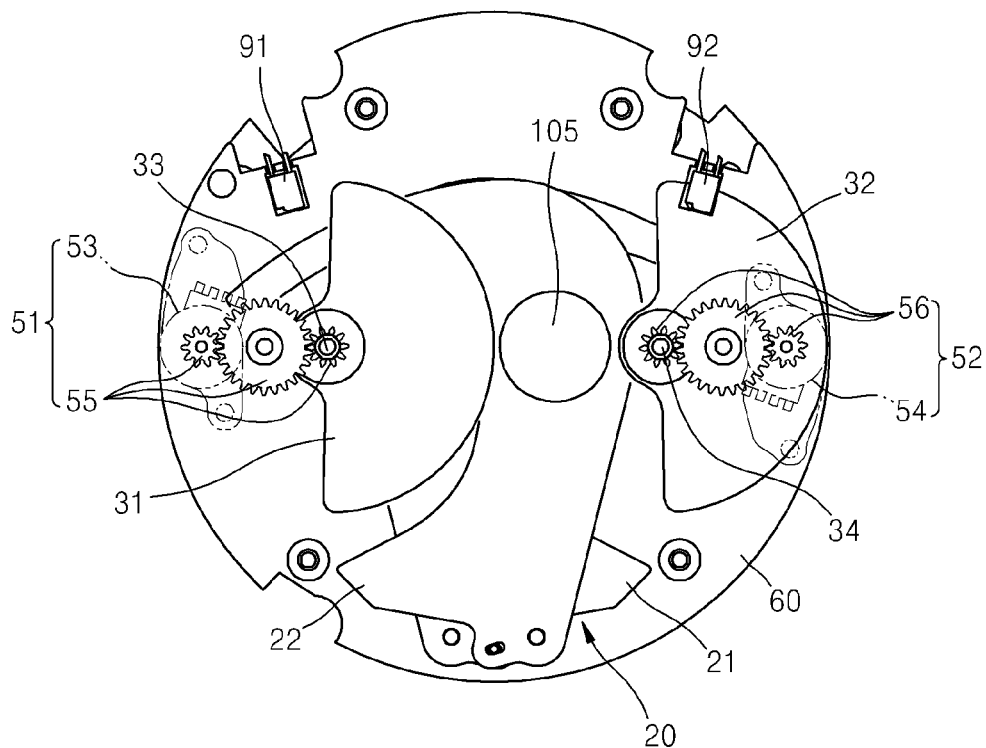

FIGS. 7 and 8 are plan views showing states of operating the shielding plate in the light amount adjusting apparatus of FIG. 3, according to an embodiment.

Referring to FIGS. 7 and 8, the first shielding plate 31 and the second shielding plate 32 are disposed on the 3D aperture plate 20, and the first center axis 33 and the second center axis 34 are disposed on edges of the first and second shielding plates 31 and 32. The first shielding plate 31 is disposed so as to receive the driving force from a first shielding plate driving unit 51. In more detail, the first shielding plate driving unit 51 includes a first motor 53 and a first gear assembly 55, and the first gear assembly 55 includes a plurality of gears that are rotated in a state of being engaged with each other. According to the present embodiment, three gears are included in the first gear assembly 55; however, three or more gears may be formed or there may be no gear in the first gear assembly 55. That is, the first shielding plate 31 may be directly connected to the first motor 53. When the first motor 53 rotates according to a command of the controller 130 of FIG. 1, the gears included in the first gear assembly 55 are engaged with each other and rotated, and the first shielding plate 31 connected to the first gear assembly 55 is rotated. Referring to FIG. 2, the shielding plate 30 and the shielding plate driving unit 50 are respectively disposed on a lower portion and an upper portion of the second intermediate plate 70. The second intermediate plate 70 includes a hole so that the shielding plate 30 and the shielding plate driving unit 50 may be connected to each other.

In addition, the light amount adjusting apparatus of FIG. 2 further includes a first location sensor 91 and a second location sensor 92 (collectively, sensors 90) that respectively sense locations of the first and second shielding plates 31 and 32. The first and second location sensors 91 and 92 may sense whether the shielding plate 30 is located on a portion of opening the first opening 103 or the second opening 105, or a portion of closing the first or second opening 103 or 105.

When the 3D images are photographed, the 3D aperture plate 20 forms the first and second openings 103 and 105, and after that, the shielding plate driving unit 50 starts to operate by the command transmitted from the controller 130 of FIG. 1 to perform the photographing operation. At this time, the controller 130 orders the first shielding plate 31 and the second shielding plate 32 to move based on location information of the first and second location sensors 91 and 92 that sense the locations of the first and second shielding plates 31 and 32. Since the first opening 103 and the second opening 105 are to be opened/closed sequentially, the first shielding plate 31 and the second shielding plate 32 close or open the first opening 103 and the second opening 105 alternately.

FIG. 7 shows a state where the second shielding plate 32 closes the second opening 105 so that the image incident through the first opening 103 may be photographed, and FIG. 8 shows a state where the first shielding plate 31 closes the first opening 103 so that the image incident through the second opening 105 may be photographed.

When the photographing apparatus of FIG. 1 captures still images, the first and second openings 103 and 105 are closed once respectively so that two images may be obtained, and then, a 3D image may be obtained from the two images. However, when the photographing apparatus of FIG. 1 captures moving pictures, the first and second shielding plates 31 and 32 repeatedly open and close the first and second openings 103 and 105 alternately. Here, the first and second shielding plates 31 and 32 may be rotated at high velocity by the first and second shielding plate driving units 51 and 52, and the photographing may be performed at high speed.

When a still image is captured, it is ideal for the images incident through the first opening 103 and the second opening 105 to be captured simultaneously. When the photographing apparatus includes one lens and one imaging device, it is not possible to capture the two images at the same time. However, if a time interval between capturing of the images of the first and second openings 103 and 105 is reduced, the same effect as that of the simultaneous photographing may be obtained. According to the shielding plate 30 of the present embodiment, the first opening 103 is opened and closed fast and the second opening 105 is closed and opened by using the first and second shielding plates 31 and 32.

In particular, when the moving pictures are taken, the controller 130 of FIG. 1 may control an image quality frame of the moving picture and the shielding plate driving unit 50 so that driving frequencies of the first and second shielding plates 31 and 32 may be synchronized. The synchronization means that the shielding plate 30 is rotated fast or slowly according to the image quality frame since the image obtaining speed of the imaging device 120 becomes fast or slow according to the image quality frame of the moving picture.

During photographing the moving pictures, time taken for obtaining one frame is divided into halves, and then, a first image may be obtained through the first opening 103 during a first half and a second image may be obtained through the second opening 105 during the other half. Therefore, when the time for obtaining the images through the first and second openings 103 and 105 is reduced, the frequency of the image quality frame is increased and the image of high quality may be obtained. For example, a driving frequency according to the present embodiment is 60 Hz; however, higher driving frequency may be obtained according to structures of the motors 53 and 54 and the gear assemblies 55 and 56.

Figure 9:
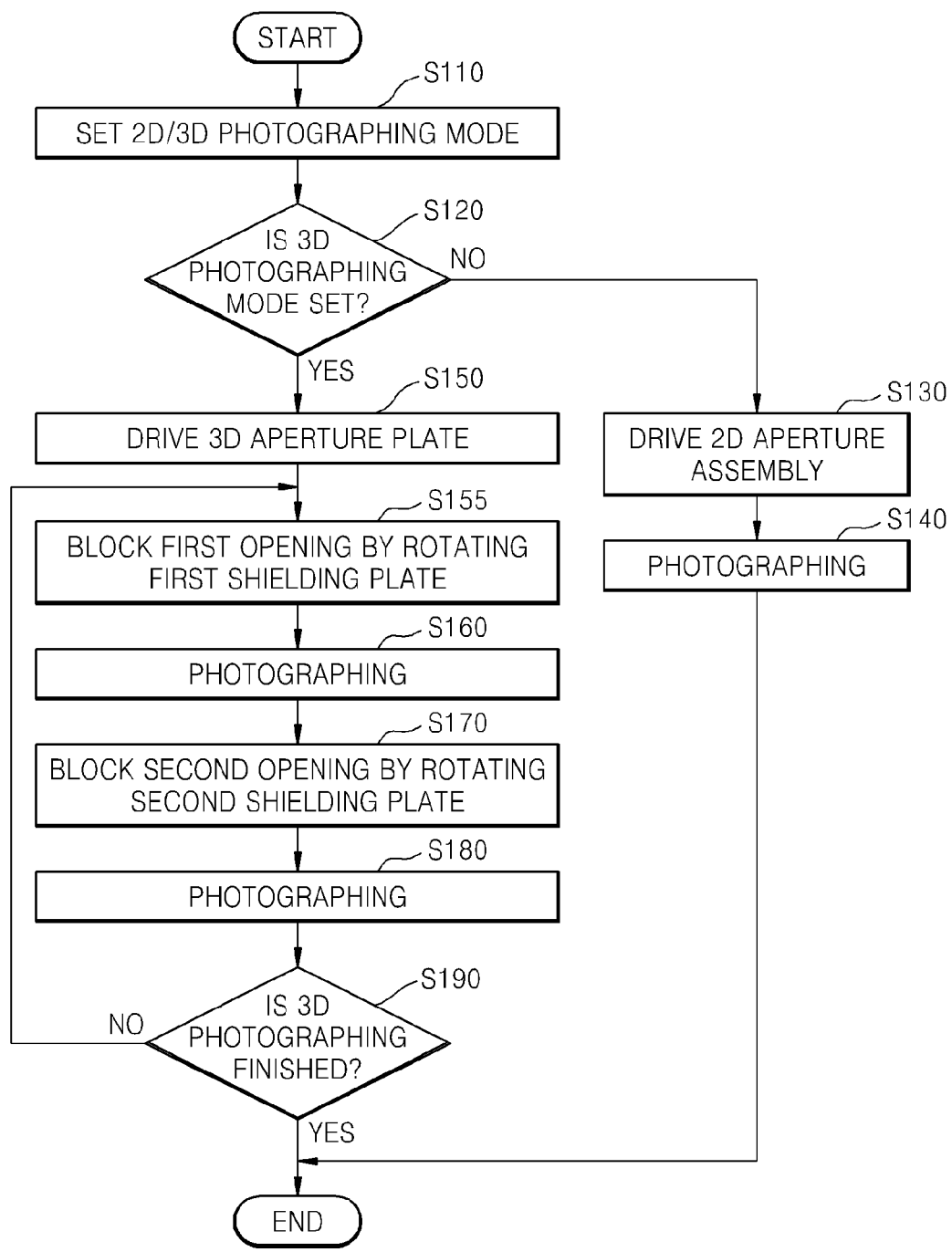
FIG. 9 is a flowchart illustrating photographing processes performed by the photographing apparatus of FIG. 1, according to an embodiment.

FIG. 9 is a flowchart illustrating photographing processes performed by the photographing apparatus of FIG. 1, according to an embodiment.

According to the photographing processes illustrated in FIG. 9, the 2D photographing mode or the 3D photographing mode may be selectively executed by using one photographing apparatus. First, it is set whether the 2D photographing mode is executed or the 3D photographing mode is executed (S110). When an operation of setting is input through the manipulating unit 150 of FIG. 1, it is identified whether the 3D photographing mode is set in the 2D/3D photographing mode set process S110 (S120).

When the 2D photographing mode is set, a 2D image is obtained by driving the 2D aperture assembly 10 of FIG. 2 in order to adjust the opening area of the via hole 101 (S130 and S140). The opening area of the via hole 101 is determined according to a brightness of the object. When the 3D photographing mode is set, the via hole 101 of the 2D aperture assembly 10 is maintained to be in completely open state, and the 3D aperture plate 20 is driven to form the first opening 103 and the second opening 105 (S150). After forming the first and second openings 103 and 105, the first shielding plate 31 is driven to block the first opening 103 (S155), and then, the light incident through the second opening 105 is captured to obtain a second image (S160). After that, the second shielding plate 32 is driven to block the second opening 105 (S170), and then, the light incident through the first opening 103 is captured to obtain a first image (S180).

It is identified whether the 3D photographing mode is finished (S190), and if the 3D photographing mode is not finished, the operations S155 through S180 are performed again to perform the next 3D photographing operation. The repetition of the 3D photographing operation may be applied to both of the photographing of still images and the photographing of moving pictures.

As described above, a 3D image may be obtained from the first image and the second image that are obtained by moving the shielding plate 30. In particular, when the moving pictures are captured, the images incident through the first and second openings 103 and 105 have to be obtained repeatedly. According to the present embodiment, the image obtaining speed may be increased by using the first shielding plate 31 and the second shielding plate 32, and thus, the 3D image of high image quality may be obtained.

According to embodiments of the photographing apparatus, the 2D photographing may be performed by using the 2D aperture assembly of the light amount adjusting apparatus, and the 3D photographing may be performed by using the 3D aperture plate of the light amount adjusting apparatus, and thus, the 2D and 3D images may be selectively obtained.

In addition, when the 3D images are captured, the two images seen from different point of views may be obtained at a high speed by using two shielding plates, and thus, the photographing apparatus may be driven at the high speed.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A light amount adjusting apparatus comprising:
   a two-dimensional (2D) aperture assembly that adjusts an opening area of a via hole through which light is transmitted;
   a three-dimensional (3D) aperture plate that forms a first opening and a second opening by blocking a part of the via hole, or moves to outside of the via hole to open the via hole;

a first shielding plate that is movable to open or close the first opening; and
a second shielding plate that is movable so as to close the second opening when the first shielding plate opens the first opening and to open the second opening when the first shielding plate closes the first opening;
wherein:
the 3D aperture plate, the first shielding plate, and the second shielding plate are moveable to the outside of the via hole to not block the transmitted light through the via hole when a 2D image photographing is performed; and
the first shielding plate and the second shielding plate are movable to the via hole to close alternatively the first opening or the second opening formed by the 3D aperture plate when a 3D image photographing is performed.

2. The light amount adjusting apparatus of claim 1, wherein the first shielding plate comprises a first center axis formed on an edge of the first shielding plate so as to rotate based on the first center axis, and the second shielding plate comprises a second center axis formed on an edge of the second shielding plate so as to rotate based on the second center axis.

3. The light amount adjusting apparatus of claim 2, wherein the first and second center axes are disposed on an outer side of the via hole, the first shielding plate is extended within a predetermined angle range based on the first center axis, and the second shielding plate is extended within a predetermined angle range based on the second center axis.

4. The light amount adjusting apparatus of claim 2, wherein the first and second shielding plates are rotatable by 360°.

5. The light amount adjusting apparatus of claim 2, further comprising:
a first shielding plate driving unit that drives the first shielding plate; and
a second shielding plate driving unit that drives the second shielding plate.

6. The light amount adjusting apparatus of claim 5, wherein the first shielding plate driving unit comprises a first motor and a first gear assembly that connects the first motor to the first center axis in order to transfer a driving force to the first shielding plate, and the second shielding plate driving unit comprises a second motor and a second gear assembly that connects the second motor to the second center axis in order to transfer the driving force to the second shielding plate.

7. The light amount adjusting apparatus of claim 1, wherein the 3D aperture plate comprises:
a first 3D aperture plate comprising a first via hole that forms the first opening; and
a second 3D aperture plate comprising a second via hole that forms the second opening.

8. The light amount adjusting apparatus of claim 7, further comprising a first intermediate plate disposed between the 2D aperture assembly and the 3D aperture plate to support the 3D aperture plate.

9. The light amount adjusting apparatus of claim 8, further comprising a 3D driving unit that simultaneously drives the first 3D aperture plate and the second 3D aperture plate.

10. The light amount adjusting apparatus of claim 9, wherein the first 3D aperture plate comprises a first through hole disposed on an outer side of the via hole, the first intermediate plate comprises a first boss that is inserted into the first through hole so as to rotatably support the first 3D aperture plate, the second 3D aperture plate comprises a second through hole disposed on an outer side of the via hole, and the first intermediate plate comprises a second boss that is inserted into the second through hole so as to rotatably support the second 3D aperture plate.

11. The light amount adjusting apparatus of claim 10, wherein the first intermediate plate comprises a guide recess between the first boss and the second boss, the first 3D aperture plate comprises a third through hole disposed on a portion corresponding to the guide recess, the second 3D aperture plate comprises a fourth through hole disposed on a portion corresponding to the guide recess, and the 3D driving unit comprises a driving pin that is inserted into the guide recess after penetrating through the third and fourth through holes so as to move along the guide recess.

12. The light amount adjusting apparatus of claim 11, wherein the first 3D aperture plate and the second 3D aperture plate are simultaneously rotated on the first through hole and the second through hole when the driving pin is moved.

13. The light amount adjusting apparatus of claim 1, further comprising:
a first location sensor that senses whether the first shielding plate is located on a portion of closing the first opening or opening the first opening; and
a second location sensor that senses whether the second shielding plate is located on a portion of closing the second opening or opening the second opening.

14. A photographing apparatus comprising:
a light amount adjusting apparatus comprising:
a two-dimensional (2D) aperture assembly that adjusts an opening area of a via hole through which the light is transmitted;
a three-dimensional (3D) aperture plate that forms a first opening and a second opening by blocking a part of the via hole, or moving to outside of the via hole to open the via hole;
a first shielding plate that is movable to open or close the first opening; and
a second shielding plate that is movable so as to close the second opening when the first shielding plate opens the first opening and to open the second opening when the first shielding plate closes the first opening;
wherein:
the 3D aperture plate, the first shielding plate, and the second shielding plate are movable to the outside of the via hole to not block the transmitted light through the via hole when a 2D image photographing is performed; and
the first shielding plate and the second shielding plate are movable to the via hole to close alternatively the first opening or the second opening formed by the 3D aperture plate when a 3D image photographing is performed;
the photographing apparatus further comprising:
an imaging device that converts the light transmitted through the light amount adjusting apparatus into an electric signal; and
a controller that executes a photographing apparatus by controlling the imaging device and the light amount adjusting apparatus, and selectively performing a 3D photographing mode in which two images are obtained by opening sequentially the first opening and the second opening that are formed by the 3D aperture plate and a 2D photographing mode in which an image is obtained by using the via hole opened by the 3D aperture plate.

15. The photographing apparatus of claim 14, wherein the controller synchronizes an image quality frame of moving picture and a frequency controlling the shielding plate driving unit, when the moving picture is captured in the 3D photographing mode.

16. The photographing apparatus of claim 14, wherein the first shielding plate and the second shielding plate are continuously rotated when the moving picture is captured in the 3D photographing mode.

* * * * *